United States Patent [19]

Higgins et al.

[11] Patent Number: 4,832,927

[45] Date of Patent: May 23, 1989

[54] USE OF POLY-NUCLEAR OXO-METALATES IN SYNTHESIS OF CRYSTALLINE OXIDES

[75] Inventors: John B. Higgins, Titusville; Roland von Ballmoos, Hopewell, both of N.J.

[73] Assignee: Mobil Oil Corporation, New York, N.Y.

[21] Appl. No.: 126,431

[22] Filed: Nov. 30, 1987

Related U.S. Application Data

[63] Continuation-in-part of Ser. No. 8,060, Jan. 14, 1987, abandoned, which is a continuation of Ser. No. 816,089, Jan. 3, 1986, abandoned.

[51] Int. Cl.$^4$ ...................... C01B 25/00; C01B 33/26
[52] U.S. Cl. .................................. 423/306; 423/327; 423/328; 502/64; 502/202; 502/208; 502/214
[58] Field of Search .................. 502/60, 64, 208, 202, 502/214; 423/328, 306, 326, 316

[56] References Cited

U.S. PATENT DOCUMENTS 4,647,442  3/1987  Derouane et al. ............... 502/214
4,744,970  5/1988  Lok et al. ........................ 502/214

Primary Examiner—Anthony McFarlane
Attorney, Agent, or Firm—Alexander J. McKillop; Charles J. Speciale; Edward F. Kenehan, Jr.

[57] ABSTRACT

There is provided a process for using poly-nuclear oxometalates in the synthesis of crystalline oxide materials. In addition to a poly-nuclear oxometalate, the reaction mixture includes an additional source of an oxide and two distinct liquid phases, one phase being an aqueous phase and the other phase being an organic phase including a water immiscible organic solvent for either the poly-nuclear oxometalate or the additional oxide source.

6 Claims, No Drawings

USE OF POLY-NUCLEAR OXO-METALATES IN SYNTHESIS OF CRYSTALLINE OXIDES

CROSS-REFERENCE TO RELATED APPLICATIONS

This application is a continuation-in-part of copending U.S. Application Ser. No. 008,060, filed Jan. 14, 1987, now abandoned, which is a continuation of U.S. Application Ser. No. 816,089, filed Jan. 3, 1986, now abandoned.

This application is also related to copending U.S. Application Ser. No. 878,754, filed June 26, 1986, which is a continuation-in-part of copending U.S. Application Serial No. 642,925, filed Aug. 21, 1984, which is, in turn, a continuation-in-part of U.S. Application Ser. No. 562,673, filed Dec. 19, 1983. This 642,925 application is also a continuation-in-part of U.S. Application Ser. No. 615,391 filed May 25, 1984.

This application is also related to U.S. Application Ser. No. 685,186, filed Dec. 21, 1984, now U.S. Pat. No. 4,623,527. This Serial No. 685,186 is, in turn, a continuation-in-part of U.S. Application Ser. No. 562,909, filed Dec. 19, 1983, now abandoned.

This application is also related to European Patent Application No. 84308812.1, filed Dec. 17, 1984, now Published European Patent Application No. 147,991. The entire disclosures of the above-mentioned U.S. and Euopean Patent Applications are expressly incorporated herein by reference.

BACKGROUND

Zeolites are one type of crystalline oxide materials. Certain zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as $Ca/2$, $Sr/2$, $Na$, $K$ or $Li$, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Although zeolites may contain silica and alumina, it is recognized that the silica and alumina portions may be replaced in whole or in part with other oxides. More particularly, for example, $GeO_2$ is an art recognized substitute for $SiO_2$ and $B_2O_3$, $Cr_2O_3$, $Fe_2O_3$, and $Ga_2O_3$ are art recognized replacements for $Al_2O_3$. Therefore, zeolites correspond to certain structures not limited to specific chemical composition. These structures may be described as porous solids consisting of corner-sharing tetrahedral, i.e. representing a three-dimensional four-connected net with T-atoms at the vertices of the net and O-atoms near the midpoints of the connecting lines. Note Collection of Simulated XRD Powder Patterns for Zeolites by Roland von Ballmoos published by Butterworth Scientific Limited on behalf of the Structure Commission of the International Zeolite Association, 1984.

Accordingly, the term zeolite as used herein shall connote not only materials containing silicon and, optionally, aluminum atoms in the crystalline lattice structure thereof, but also materials which contain suitable replacement atoms for such silicon and/or aluminum.

Certain inorganic cations as well as organic amines and quaternary ammonium compounds are known to serve as structure-directing agents in the synthesis of zeolites. Note the article by Lok et al, entitled "The Role of Organic Molecules in Molecular Sieve Synthesis" which appeared in ZEOLITES, 1983, Vol. 3, Ocotber. Such structure-directing agents are also termed, simply, directing agents or templating agents.

SUMMARY

According to an aspect of the invention, there is provided a process for preparing a crystalline oxide material comprising forming a crystallization mixture comprising a source of one or more oxides capable of being tetrahedrally coordinated, said crystallization mixture further comprising a poly-nuclear oxometalate, said crystallization mixture further comprising water and a water immissible organic solvent, whereby said crystallization mixture has two-distinct liquid phases, one of said liquid phases being an organic phase and the other of said liquid phases being an aqueous phase, said process further comprising maintaining said crystallization mixture under conditions sufficient to form crystals of said crystalline oxide material, wherein, at the start of the crystallization, either a source of said oxide which is capable of being tetrahedrally coordinated or said poly-nuclear oxometalate is dissolved in said organic phase, said crystalline oxide material having a composition comprising oxides from said source of one or more oxides and oxides from said poly-nuclear oxometalate. The sources of one or more oxides capable of being tetrahedrally coordinated may be, e.g., sources of oxides of Si, Al, P, B, Ge and/or Ga. The poly-nuclear oxometalate directing agent may be composed of at least 3 edge of corner-sharing metal-oxygen tetrahedra and/or octahedra.

EMBODIMENTS

In accordance with an aspect of the present invention, polynuclear oxometalates are used as sources of oxides in crystalline oxide synthesis. The large cluster ions serve as oxide sources in solutions or in gels. The polynuclear oxometalates may induce novel structures.

Common examples of the clusters include $PW_{12}O_{40}{}^{3-}$, $W_6O_{19}{}^{2-}$, and $Al_{13}O_4(OH)_{24}(H_2O)_{12}{}^{7+}$.

The multiply-charged clusters can favor novel charge distributions and compositions in the frameworks. The ordering of the atom species (e.g. Si-Al distributions) may therefore be different than in the presently known zeolites. Because of the relatively limited stability of the polynuclear clusters in aqueous media (pH dependence of stability domain) special synthesis techniques may have to be applied. One such synthesis technique involves a two-phase method. Such a two-phase method is described in Published European Patent Application No. 146,384.

In the foregoing Examples, the X-ray diffraction data were collected with a Rigaku X-ray system, using copper K-alpha radiation. The positions of the peaks, expressed in degrees 2 theta, where theta is the Bragg angle, were determined by step-scanning at 0.02 degrees of 2 theta intervals and a counting time of 1 second for each step. The interplanar spaces, d, measured in Angstrom units (A), and the relative intensities of the lines, $I/I_0$, where $I_0$ is one-hundredth of the intensity of the strongest line, including subtraction of the background, were derived with the use of a profile fitting routine.

In the foregoing Example, sorption capacities were determined as follows. A weighted sample of the calcined adsorbant was contacted with a flowing stream of the equilibrium vapor of the adsorbate at 25° C., admixed with dry nitrogen. Adsorbates were water vapor and n-hexane vapor. The sample temperature was maintained at 90° C. for n-hexane and at 60° C. for water. The increase in weight was measured gravimetrically and converted to the adsorption capacity of the sample in weight percent of calcined adsorbant.

EXAMPLE 1

24.9g $H_3PO_4$ (85%) was added to 27.5g $H_2O$ with stirring. Then 15.0g $Al_2O_3$ (Catapal from Conoco) was stirred into this aqueous phase. This aqueous phase was digested at 80° C. for ¾ hr. (pH=4–6). 8.1g NaOH was mixed with 63.0g $H_2O$, and this aqueous NaOH was added to the aqueous phase which was in the form of a gel.

An organic phase was formed by mixing 18.8g Si-$(OC_2H_5)_4$ and $H_3PW_{12}O_{40}$ with 54.0g 1-hexanol. The organic phase was added to the aqueous gel and the two-phase system was stirred at 40°–50° C. for ¼ hr.

The reaction mixture was placed into a 300 ml stainless steel autoclave, gradually heated to a temperature of 130° C. over a period of 3 hrs, and held at 130° C. for 24 hrs. The reaction mixture was then heated to a final temperature of 200° C. and held at 200° C. for 24 hrs.

It is noted that the reaction mixture formed a creamy gel suggesting that the volume of the reaction mixture should have been reduced by about 10 percent.

The product gave the X-ray diffraction data in Table 1.

TABLE 1

| d-space | 2 × theta | $I/I_o$ |
|---|---|---|
| 8.753 | 10.10 | 100 |
| 6.804 | 13.00 | 14 |
| 4.768 | 18.61 | 12 |
| 4.651 | 19.08 | 13 |
| 3.715 | 23.94 | 24 |
| 3.674 | 24.20 | 18 |
| 3.393 | 26.24 | 19 |
| 3.218 | 27 69 | 21 |
| 3.165 | 28.17 | 10 |

TABLE 1-continued

| d-space | 2 × theta | $I/I_o$ |
|---|---|---|
| 3.033 | 29.45 | 11 |
| Sorption Capacity: | | |
| $H_2O$ (60° C.) | | 0.85 |
| n-Hexane (90° C.) | | 0.68 |

EXAMPLE 2

8.4g $NH_4H_2PO_4$ were added to 40.0g $H_2O$ with stirring (pH=4.5). In a separate vessel, 10.0g aqueous tetraethylammonium hydroxide (TEAOH, 40%), 2.7g aqueous $NH_4OH$ (29%), and 20.0g $H_3PW_{12}O_{40}$ were mixed with 20g $H_2O$. This second aqueous system was slowly added to the phosphate solution (pH=ca.7).

An organic phase was formed by mixing 40.0g Si-$(OC_2H_5)_4$ with 30.0g 1-hexanol. This organic phase was added to the aqueous phase with intensive stirring. The pH was adjusted to neutral with $NH_4OH$. The reaction mixture was maintained at 180° C. for 120 hrs.

The product gave the X-ray diffraction data in Table 2.

TABLE 2

| d space | 2 × theta | $I/I_o$ |
|---|---|---|
| 15.709 | 5.62 | 70 |
| 12.355 | 7.15 | 20 |
| 10.538 | 8.38 | 9 |
| 7.764 | 11.39 | 100 |
| 6.910 | 12.80 | 65 |
| 6.321 | 14.01 | 7 |
| 5.181 | 17.10 | 85 |
| 4.883 | 18.15 | 8 |
| 4.328 | 20.50 | 95 |
| 4.128 | 21.51 | 19 |
| 4.060 | 21.87 | 11 |
| 3.581 | 24.84 | 38 |
| 3.528 | 25.23 | 22 |
| 3.144 | 28.36 | 40 |
| 3.089 | 28.88 | 87 |
| Sorption Capacity: | | |
| $H_2O$ (60° C.) | | 0.23 |
| n-Hexane (90° C.) | | 0.15 |

EXAMPLE 3

11.9g $NH_4H_2PO_4$ was added to 40.0g $H_2O$. In a separate vesel, 10.0g aqueous TEAOH (40%), 2.7g aqueous $NH_4OH$ (29%) and 20.0g $H_3PW_{12}O_{40}$. $H_2O$ were mixed with 20.0g $H_2O$. The phosphate solution was added slowly to this second aqueous system with stirring.

An organic phase was formed by mixing 40.0g Si-$(OC_2H_5)_4$ with 30.0g 1-hexanol. This organic phase was added to the aqueous phase with intensive stirring (pH=6–6.5). The reaction mixture was maintained at 180° C. for 120 hrs.

The product gave the X-ray diffraction data in Table 3.

TABLE 3

| d-space | 2 × theta | $I/I_o$ |
|---|---|---|
| 15.760 | 5.60 | 59 |
| 12.438 | 7.10 | 23 |
| 10.463 | 8.44 | 12 |
| 7.828 | 11.29 | 100 |
| 6.958 | 12.71 | 79 |
| 6.335 | 13.98 | 8 |
| 5.202 | 17.03 | 75 |
| 4.910 | 18.05 | 7 |
| 4.348 | 20.41 | 82 |
| 4.146 | 21.43 | 15 |

TABLE 3-continued

| d-space | 2 × theta | $I/I_o$ |
| --- | --- | --- |
| 4.079 | 21.79 | 10 |
| 3.574 | 24.90 | 30 |
| 3.560 | 24.99 | 29 |
| 3.144 | 28.36 | 30 |
| 3.100 | 28.78 | 78 |
| Sorption Capacity: | | |
| $H_2O$ (60° C.) | | 0.0 |
| n-Hexane (90° C.) | | 0.0 |

What is claimed is:

1. A process for preparing a crystalline oxide material comprising forming a crystallization mixture comprising a source of one or more oxides capable of being tetrahedrally coordinated, said crystallization mixture further comprising a poly-nuclear oxometalate, said crystallization mixture further comprising water and a water immissible organic solvent, whereby said crystallization mixture has two-distinct liquid phases, one of said liquid phases being an organic phase and the other of said liquid phases being an aqueous phase, said process further comprising maintaining said crystallization mixture under conditions sufficient to form crystals of said crystalline oxide material, wherein, at the start of the crystallization, either a source of said oxide which is capable of being tetrahedrally coordinated or said poly-nuclear oxometalate is dissolved in said organic phase, said crystalline oxide material having a composition comprising oxides from said source of one or more oxides and oxides from said poly-nuclear oxometalate.

2. A process according to claim 1, wherein said source of one or more oxides capable of being tetrahedrally coordinated is a source of an oxide of Si, Al, P, B, Ge, Ga or mixtures thereof.

3. A process according to claim 1, wherein said poly-nuclear oxometalate is composed of at least 3 edge or corner-sharing metal-oxygen tetrahedra, octahedra or mixtures thereof.

4. A process according to claim 1, wherein said poly-nuclear oxometalate is selected from the group consisting of $PW_{12}O_{40}^{3-}$, $W_6O_{19}^{2-}$ and $Al_{13}O_4(OH)_{24}(H_2O)_{12}^{7+}$.

5. A process according to claim 1, wherein said crystallization mixture comprises $H_3PO_4$, $Al_2O_3$, NaOH, $H_3PW_{12}O_{40}$, $Si(OC_2H_5)_4$ and 1-hexanol, whereby the crystalline oxide material which is obtained has the X-ray diffraction pattern set forth in Table 1.

6. A process according to claim 1, wherein said crystallization mixture comprises $NH_4H_2PO_4$, tetraethylammonium hydroxide, $NH_4OH$, $H_3PW_{12}O_{40}$, $Si(OC_2H_5)_4$, and 1-hexanol, whereby the crystalline oxide material which is obtained has the X-ray diffraction pattern set forth in Table 2.

* * * * *